(12) United States Patent
Hu

(10) Patent No.: US 10,245,646 B2
(45) Date of Patent: Apr. 2, 2019

(54) QUICK DETACHABLE AND ADJUSTABLE MAGNETIC SEAT FOR SLEEVE

(71) Applicant: Bobby Hu, Taichung (TW)

(72) Inventor: Bobby Hu, Taichung (TW)

( * ) Notice: Subject to any disclaimer, the term of this patent is extended or adjusted under 35 U.S.C. 154(b) by 57 days.

(21) Appl. No.: 15/585,472

(22) Filed: May 3, 2017

(65) Prior Publication Data

US 2018/0245706 A1     Aug. 30, 2018

(30) Foreign Application Priority Data

Feb. 24, 2017    (TW) .............................. 106106333 A

(51) Int. Cl.
| | |
|---|---|
| *B23B 31/00* | (2006.01) |
| *B23B 31/28* | (2006.01) |
| *B25B 13/06* | (2006.01) |
| *B25B 23/00* | (2006.01) |
| *B25B 23/12* | (2006.01) |
| *H01F 7/02* | (2006.01) |
| *H01R 11/30* | (2006.01) |

(52) U.S. Cl.
CPC ............ *B23B 31/003* (2013.01); *B23B 31/28* (2013.01); *B25B 13/06* (2013.01); *B25B 23/0035* (2013.01); *B25B 23/12* (2013.01); *B23B 2231/04* (2013.01); *H01F 7/0205* (2013.01); *H01R 11/30* (2013.01); *Y10T 279/3406* (2015.01); *Y10T 279/3481* (2015.01)

(58) Field of Classification Search
CPC ....... B23B 31/003; B23B 31/06; B23B 31/07; B23B 2231/04; B25B 13/06; B25B 23/12; B25B 23/0035; Y10T 279/3406; Y10T 279/3481
See application file for complete search history.

(56) References Cited

U.S. PATENT DOCUMENTS

| | | | | |
|---|---|---|---|---|
| 6,311,989 B1 * | 11/2001 | Rosanwo | ............... | B25B 15/001 279/75 |
| 6,925,914 B2 * | 8/2005 | Hsien | ...................... | B25B 13/06 81/124.1 |
| 6,973,858 B2 * | 12/2005 | Huang | .................. | B25B 15/001 279/82 |
| 7,363,839 B2 * | 4/2008 | Chiang | ............... | B25B 23/0028 81/177.1 |
| 7,430,943 B2 * | 10/2008 | Chiang | ............... | B25B 23/0028 81/177.1 |
| 7,469,909 B2 * | 12/2008 | Strauch | ............... | B25B 23/0035 279/75 |

(Continued)

*Primary Examiner* — Eric A Gates

(74) *Attorney, Agent, or Firm* — WPAT, PC

(57) ABSTRACT

A quick detachable and adjustable magnetic seat for sleeve includes a magnetic device and a detachable positioning device. The magnetic device includes a first end and a second end. The first end is magnetic. The detachable positioning device includes a connecting end slidably disposed on the second end of the magnetic device, such that the magnetic device axially slides against the detachable positioning device. The detachable positioning device further includes a resilient quick detach device disposed on one end of the detachable positioning device away from the connecting end, whereby the detachable positioning device is removably disposed in a sleeve. Therefore, when the sleeve is damaged or broken, the adjustable magnetic seat is efficiently removed from the sleeve and re-installed in a new sleeve replacement.

12 Claims, 11 Drawing Sheets

(56) References Cited

U.S. PATENT DOCUMENTS

| | | | | |
|---|---|---|---|---|
| 8,176,817 B2* | 5/2012 | Liu | ............... | B25B 23/0028 |
| | | | | 81/177.75 |
| 8,468,913 B1* | 6/2013 | Bond | ............ | B25B 23/0035 |
| | | | | 81/438 |
| 8,550,471 B2* | 10/2013 | Huang | ............... | B23B 31/06 |
| | | | | 279/22 |
| 9,101,987 B2* | 8/2015 | Cornwell | ............ | B23B 31/107 |
| 9,718,174 B2* | 8/2017 | Tsai | ............ | B25B 15/02 |
| 2017/0165818 A1* | 6/2017 | Zimmermann | ......... | B25B 21/00 |

* cited by examiner

QUICK DETACHABLE AND ADJUSTABLE MAGNETIC SEAT FOR SLEEVE

BACKGROUND OF THE INVENTION

1. Field of the Invention

The present invention relates to magnetic seats, and more particularly, to a quick detachable and adjustable magnetic seat for sleeve.

2. Description of the Related Art

A conventional resiliently movable magnetic device for sleeve is developed for meeting convenience of usage, so as to move a target object during the movement of the sleeve. Also, the target object is thereby able to be removed efficiently.

As shown by FIG. 1, a conventional magnetic driving tool 10 comprises a main body 11, a fix device including a first fixing member 12 and a second fixing member 13, and a magnetic device 14. The main body 11 is provided with a driving end 11a and an operating end 11b disposed in opposite to the driving end 11a. The first fixing member 12 is engaged with one side of a protrusion 15 inside the main body 11 facing the driving end 11a, while the second fixing member 13 is engaged with the other side of the protrusion 15 facing the operating end 11b. The magnetic device 14 has one end thereof slidably disposed in the fix device and capable of sliding in a limited range against the fix device, with the other end thereof capable of attracting the target object and sliding along the axis of the main body 11 against the fix device. However, once the magnetic device 14 and the fix device are combined into the main body 11, the combination thereof is unable to be disassembled. When the driving tool 10 is damaged or broken, the magnetic device 14 is prevented from being re-assembled into a new driving tool 10 replacement to be exploited. As a result, the whole damaged driving tool 10 shall be discarded together with the inner assemblies, causing a waste of resource.

As shown by FIG. 2, another conventional resilient sleeve 20 is further developed, comprising a sleeve body 21, a magnet seat 22, a magnet 23, a spring 24, and a C-clamp 25. The magnet 23 and the spring 24 are installed inside the magnet seat 22, with one end of the spring 24 resisting against the magnet 23. The combination of the magnet seat 22, the magnet 23, and the spring 24 is installed in a housing space 26 in the sleeve body 21, with the other end of the spring 24 resisting against the bottom portion of the housing space 26. Also, the C-clamp 25 is disposed around an outer edge of the magnet seat 22 for preventing the combination of the magnet seat 22 and the magnet 23 from detaching from the housing space 26. However, as described above, the combination of the magnet seat 22 and the magnet 23 is not allowed to be detached from the sleeve body 21 once the combination is installed therein. When the resilient sleeve 20 is damaged or broken, the resilient sleeve 20 shall be discarded together with the sleeve body 21, causing a waste of resource as well.

SUMMARY OF THE INVENTION

For improving the issues above, a quick detachable and adjustable magnet seat for sleeve is disclosed for achieving an efficiently detaching the adjustable magnet seat from the sleeve when the sleeve is damaged or broken. Accordingly, the adjustable magnet seat is not necessarily discarded together with the damaged sleeve.

For achieving the aforementioned objectives, the present invention provides an embodiment of a quick detachable and adjustable magnet seat for sleeve, comprising:

a magnetic device including a first end and a second end, the first end being magnetic; and a detachable positioning device including a connecting end slidably disposed on the second end of the magnetic device, such that the magnetic device axially slides against the detachable positioning device, the detachable positioning device further including a resilient quick detach device disposed on one end of the detachable positioning device away from the connecting end, whereby the detachable positioning device is removably disposed in a sleeve.

Preferably, when the adjustable magnetic seat is installed in the sleeve, the adjustable magnetic seat is axially pushed toward one end of the sleeve, so as to be efficiently engaged with the sleeve. When the adjustable magnetic seat is to be removed from the sleeve, the adjustable magnetic seat is axially pushed toward the other end of the sleeve, so as to be efficiently detached from the sleeve.

Preferably, the resilient quick detach device refers to a resilient clamp. The detachable positioning device is provided with a first outer diameter, and the resilient clamp is provided with a second outer diameter. The second outer diameter is larger than the first outer diameter, such that the resilient engage member is allowed to be engaged with the inner side of the sleeve. Also, the resilient engage member is able to be optionally situated at an elastic deformation position, whereby the detachable positioning device is allowed to freely pass through the sleeve.

Preferably, a spring disposed between the magnetic device and the detachable positioning device, such that the magnetic device is allowed to move back to the original position after sliding against the detachable positioning device.

Preferably, the magnetic device is provided with a support portion which faces the connecting end. When the support portion contacts the connecting end, the spring is not completely compressed.

Preferably, the magnetic device includes a first axle member and a magnet. The magnet is disposed on one end of the first axle member for providing a magnetism. The detachable positioning device includes a second axle member on where the connecting end is formed. The connecting end of the second axle member is slidably disposed on the second end of the magnetic device. The resilient quick detach device is disposed on the other end of the second axle member away from the connecting end. The first axle member is provided with a first limit portion, and the second axle member is provided with a second limit portion. When the spring moves the magnetic device back to the original position, the first limit portion and the second limit portion prevent the spring from detaching the magnetic device from the detachable positioning device.

Preferably, the detachable positioning device further includes a resisting side facing the resilient quick detach device, wherein the resisting side is provided with a third outer diameter larger than the first outer diameter of the detachable positioning device, such that a received section forms between the resilient quick detach device and the resisting side. The received section is received in the protrusion ring formed on the inner side of the sleeve.

Preferably, the detachable positioning device further includes a sliding seat slidably disposed around the second axle member. One end of the sliding seat is resisted by the spring, and the resisting end is placed on one end of the sliding seat away from the spring.

Preferably, an outer wall of the second axle member is further provided with a third limit portion, and the inner side of the sliding seat is provided with a fourth limit portion. The third and fourth limit portions conduct a blocking function, so as to prevent the sliding seat from detaching from the second axle member toward the resilient quick detach device.

Preferably, the magnetic device further includes a bear seat, which receives the magnet. The bear seat and the magnet are disposed on the first axle member. The spring is placed between the bear seat and the detachable positioning device, and the support portion placed between the bear seat and the connecting end.

Preferably in one embodiment, the resilient engage member refers to a C-clamp disposed on the detachable positioning device. The cross-section of the C-clamp is formed in a circular shape. The second outer diameter is defined as the length of the diameter starting from the outer edge of the C-clamp, while the first outer diameter is defined as the length of the diameter of the second axle member of the detachable positioning device adjacent to the resilient engage member.

Preferably in one embodiment, the resilient engage member refers to a hook portion integrally formed on the detachable positioning device. The second outer diameter is defined as the length of the diameter starting from the outer edge of the hook portion, while the first outer diameter defined as the length of the diameter of the second axle member of the detachable positioning device adjacent to the resilient engage member.

Preferably in one embodiment, the resilient engage member includes a ball member and a resilient member that are embedded in the detachable positioning device. The second outer diameter is defined as the length of the diameter starting from the outer edge of the ball member, while the first outer diameter defined as the length of the diameter of the second axle member of the detachable positioning device adjacent to the resilient engage member.

With such configuration, the adjustable magnetic seat of the present invention is allowed to be efficiently installed in or removed from the sleeve, such that when the sleeve is damaged or broken, the user is able to efficiently remove the adjustable magnetic seat from the sleeve and subsequently applied the adjustable magnetic seat to a new sleeve. Therefore, the adjustable magnetic seat is not necessarily discarded with the damaged sleeve, thus preventing a waste or resource and saving the cost of purchasing a replacement of the whole assembly.

DETAILED DESCRIPTION OF THE INVENTION

Figure 1:
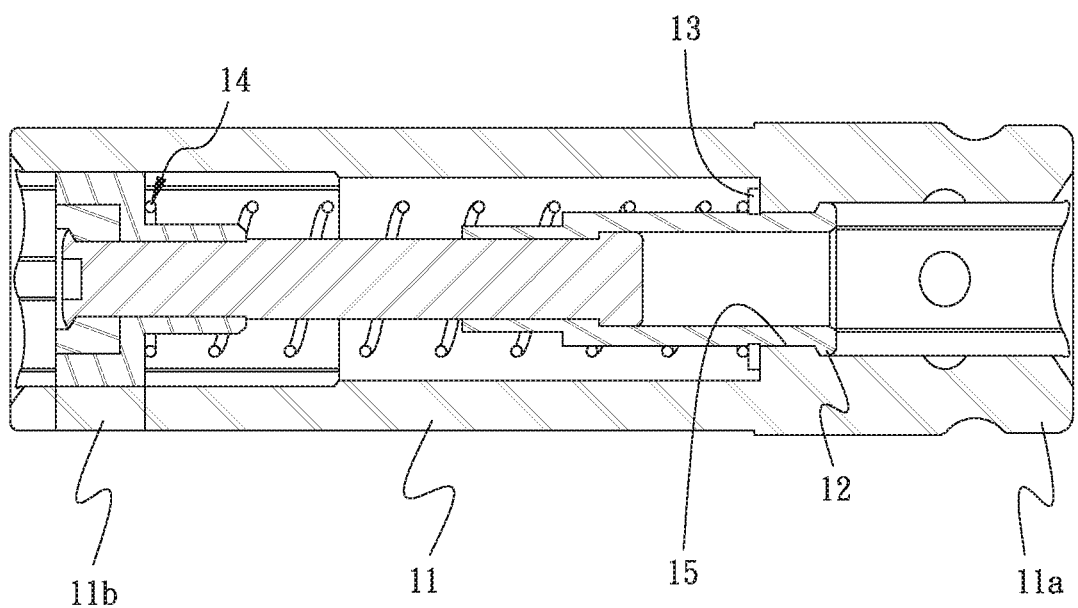
FIG. 1 is a sectional view of a conventional magnetic driving tool.
Figure 2:
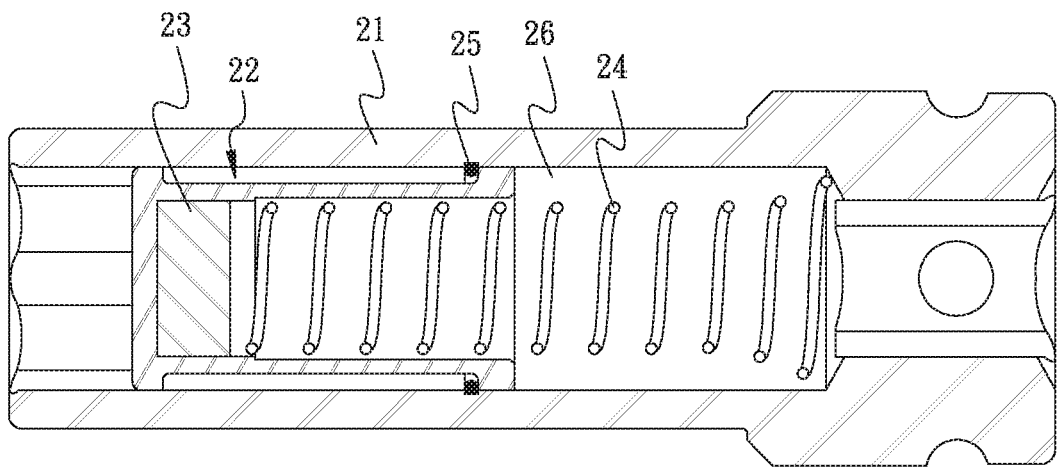
FIG. 2 is a sectional view of a conventional resilient sleeve.
Figure 3:
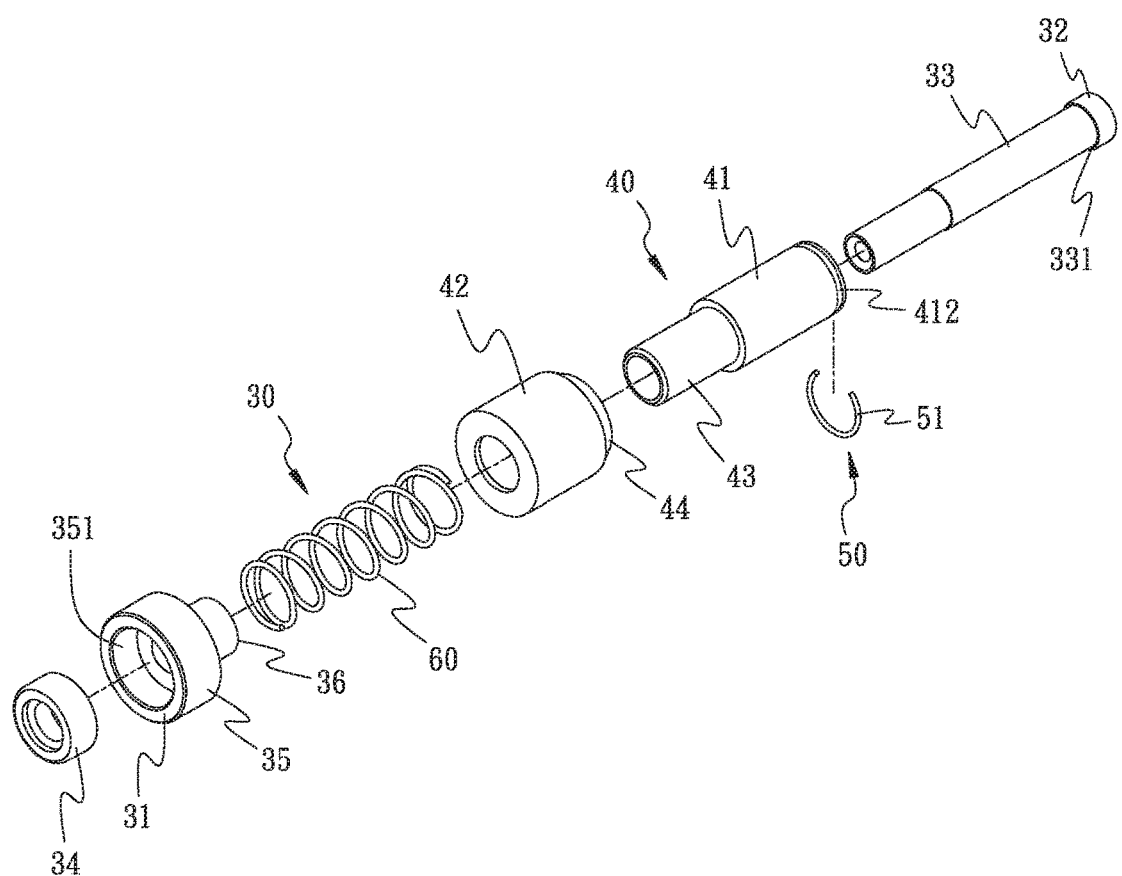
FIG. 3 is an exploded view of the quick detachable and adjustable magnetic seat for sleeve in accordance with an embodiment of the present invention.
Figure 4:
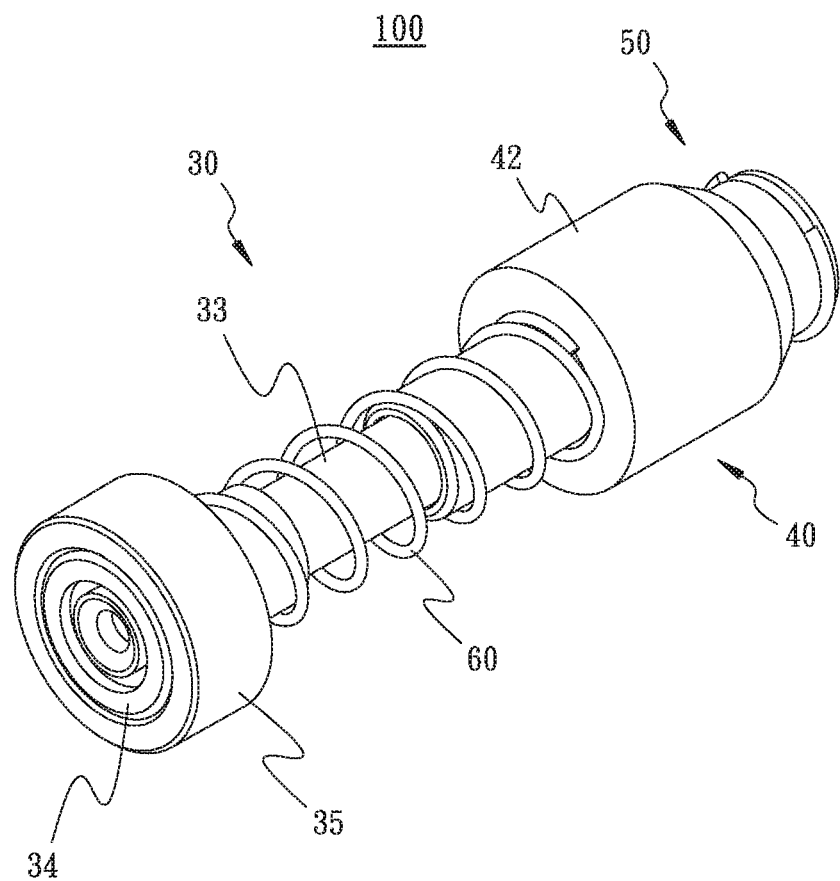
FIG. 4 is a perspective view of the quick detachable and adjustable magnetic seat for sleeve in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion. Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Referring to FIG. 3 to FIG. 9 illustrating a first embodiment of the present invention, an adjustable magnetic seat 100 capable of being efficiently installed in or removed from a sleeve 200 comprises a magnetic device 30 and a detachable positioning device 40.

The magnetic device 30 includes a first end 31 and a second end 32, wherein the first end 31 is magnetic. In an embodiment of the present invention, the magnetic device 30 is provided with a first axle member 33 and a magnet 34, wherein the magnet 34 is disposed on one end of the first axle member 33 for providing the magnetism. The second end 32 is disposed on the other end of the first axle member 33 away from the magnet 34. Also, the magnetic device 30 further includes a bear seat 35. The bear seat 35 is provided with a containing bore 351 for containing the magnet 34, such that the bear seat 35 and the magnet 34 are disposed on the first axle member 33, whereby the bear seat 35 is prevented from detaching from the end of the first axle member 33.

The detachable positioning device 40 includes a second axle member 41 and a sliding seat 42 disposed around the outer edge of the second axle member 41. Also, the detachable positioning device 40 further includes a connecting end 43 and a resisting side 44 disposed in opposite to the connecting end 43. The connecting end 43 is formed on the second axle member 41, while the resisting side 44 disposed on the other end of the sliding seat 42 away from the connecting end 43. The connecting end 43 of the second axle member 41 is slidably disposed on the second end 32 of the magnetic device 30. The magnetic device 30 is allowed to axially slide against the detachable positioning device 40.

One end of the detachable positioning device 40 away from the connecting end 43 is provided with a resilient quick detach device 50, which allows the detachable positioning device 40 to be efficiently installed in or removed from the sleeve 200. In an embodiment of the present invention, referring to FIG. 5, the detachable positioning device 40 is provided with a first outer diameter D1. The resilient quick detach device 50 refers to a resilient engage member having a second outer diameter D2, and the second outer diameter D2 is larger than the first outer diameter D1. The resilient engage member is a C-clamp 51 disposed in a ring groove 412 formed on the second axle member 41 of the detachable positioning device 40, wherein the cross-section of the C-clamp 51 is formed in a circular shape. The second outer diameter D2 is defined as the length of the diameter crossing two distal ends that are located at an outer edge of the C-clamp 51, and the first outer diameter D1 is defined as the length of the diameter of a portion of the second axle member 41 of the detachable positioning device 40 adjacent to the resilient engage member, such that the resilient engage member is allowed to be engaged in the inner edge of the sleeve 200. Also, the resilient engage member is allowed to be optionally situated at an elastic deformation position. When at the elastic deformation position, the resilient engage member is provided with a radial contraction, whereby the detachable positioning device 40 freely passes through the sleeve 200, allowing the adjustable magnetic seat 100 to be efficiently installed in or detached from the sleeve 200.

A spring 60 is disposed between the magnetic device 30 and the detachable positioning device 40. One end of the spring 60 resists against the bear seat 35, with the other end thereof resisting against the sliding seat 42 of the detachable positioning device 40. The resisting side 44 is positioned on one end of the sliding seat 42 away from the spring 60. The spring 60 allows the magnetic device 30 to move back to the original position after sliding against the detachable positioning device 40. The magnetic device 30 is provided with a support portion 36 facing the connecting end 43. In an embodiment of the present invention, the support portion 36 is formed on the bear seat 35. When the adjustable magnetic seat 100 is finished being installed in the sleeve 200, the support portion 36 contacts and resists against the connecting end 43, such that the spring 60 is not completely compressed, thereby providing a protection function upon the spring 60.

The resilient quick detach device 50 is disposed on one end of the second axle member 41 away from the connecting end 43. The first axle member 33 is provided with a first limit portion 331, and the second axle member 41 is provided with a second limit portion 411. When the spring 60 restores the magnetic device 30 back to the original position, the first limit portion 331 and the second limit portion 411 prevent the spring 60 from detaching the magnetic device 30 from the detachable positioning device 40. In an embodiment of the present invention, the first limit portion 331 is positioned at the second end 32 of the first axle member 33.

Furthermore, the resisting side 44 of the sliding seat 42 of the detachable positioning device 40 faces the resilient quick detach device 50. The resisting side 44 is provided with a third outer diameter D3 which is larger than the first outer diameter D1 of the detachable positioning device 40, such that a received section 45 forms between the resilient quick detach device 50 and the resisting side 44. The received section 45 is received by the protrusion ring 201 formed on an inner side of the sleeve 200. With the spring 60 resisting against the sliding seat 42, the length of the received section 45 is variable to conform with different thickness variation of the protrusion ring 201 of the sleeve 200, thus being applicable to a wide range exploitation. In addition, an outer wall of the second axle member 41 is provided with a third limit portion 413, and the inner side of the sliding seat 42 is provided with a fourth limit portion 421, such that the third limit portion 413 and the fourth limit portion 421 conduct a blocking function, so as to prevent the sliding seat 42 from detaching from the second axle member 41 toward the resilient quick detach device 50.

Figure 6:
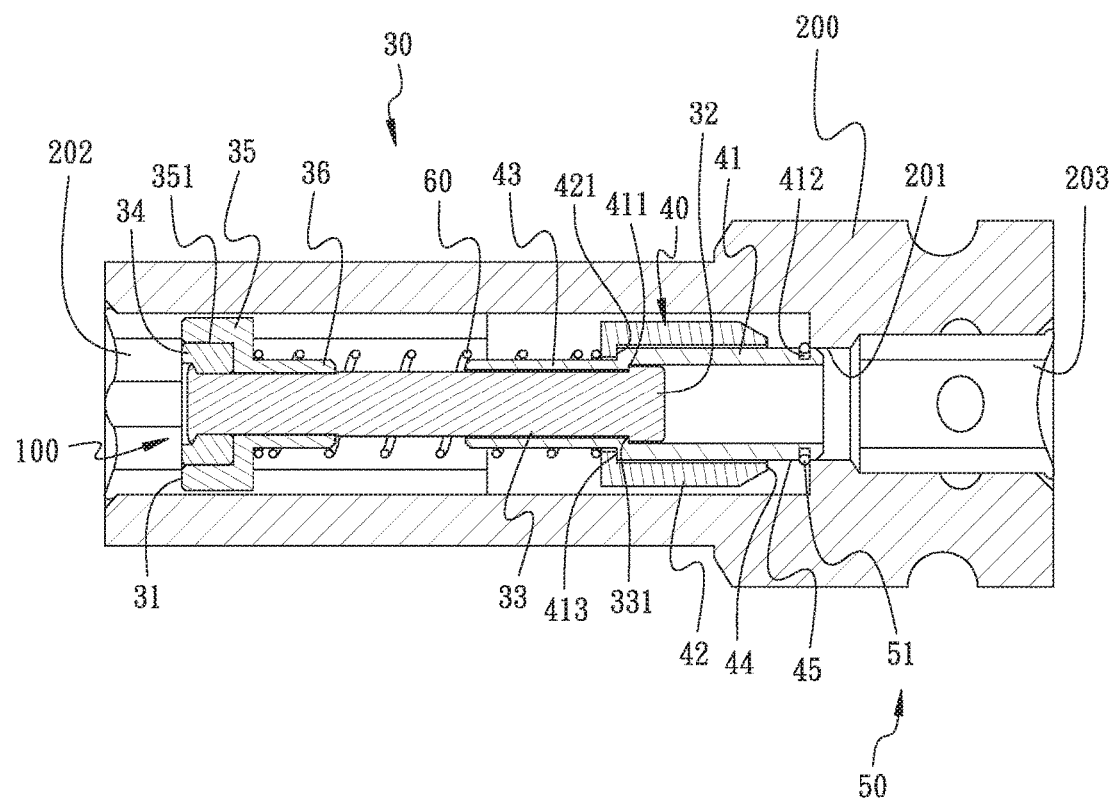
FIG. 6 is a schematic view illustrating the quick detachable and adjustable magnetic seat for sleeve being installed in a sleeve, wherein the resilient quick detach device is in a status where the resilient engage member being situated at a normal position.
Figure 7:
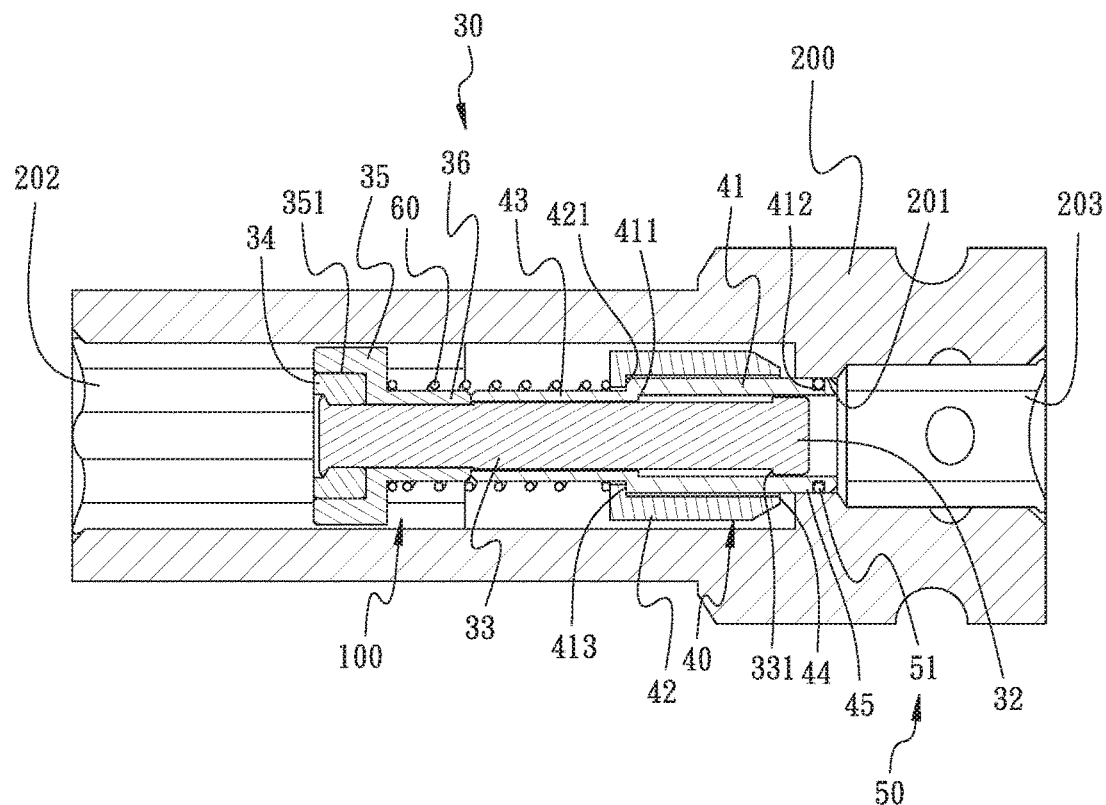
FIG. 7 is a schematic view illustrating the quick detachable and adjustable magnetic seat for sleeve being installed in a sleeve, wherein the resilient quick detach device is in a status where the resilient engage member being optionally situated at an elastic deformation position.
Figure 8:
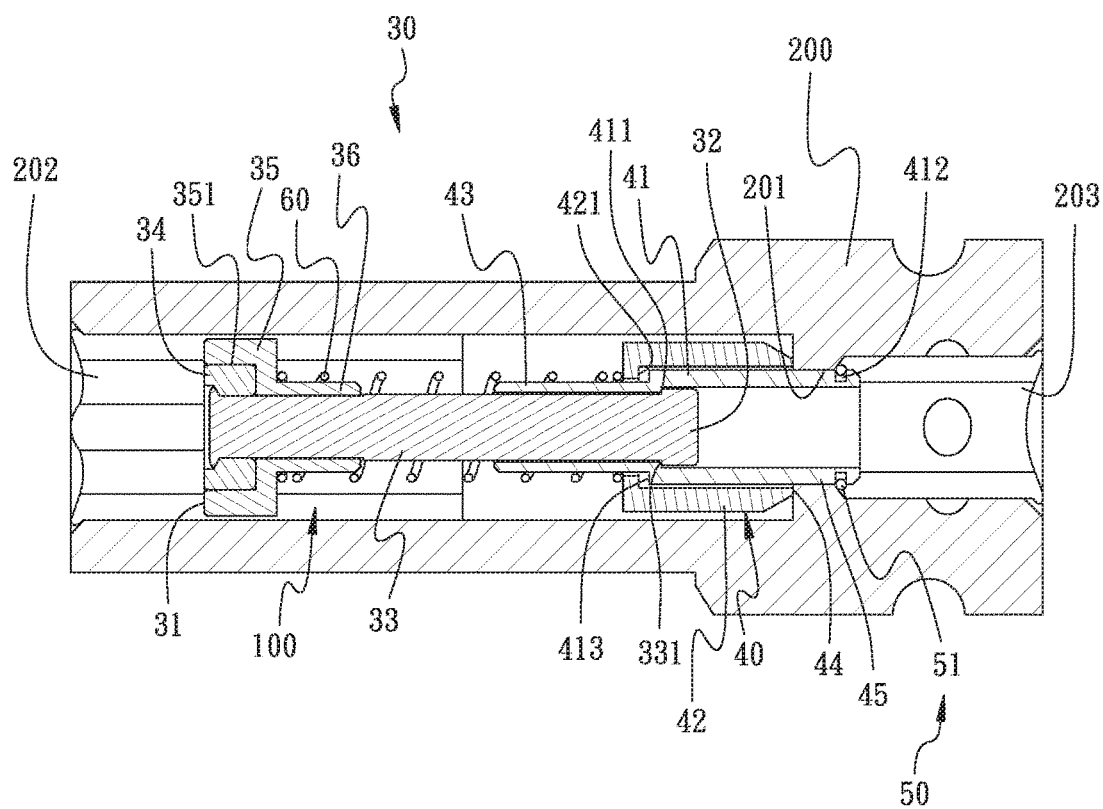
FIG. 8 is a schematic view illustrating the installation complete status of the quick detachable and adjustable magnetic seat for sleeve in a sleeve.

Referring to FIG. 6 to FIG. 8, process of the adjustable magnetic seat 100 being installed in the sleeve 200 is schematically illustrated. As shown by FIG. 6, when the adjustable magnetic seat 100 is being installed into the sleeve 200, the resilient quick detach device 50 faces a hexagonal bore 202 which is disposed on one end of the sleeve 200, such that the adjustable magnetic seat 100 is axially pushed toward the sleeve 200 to be installed therein.

Figure 5:
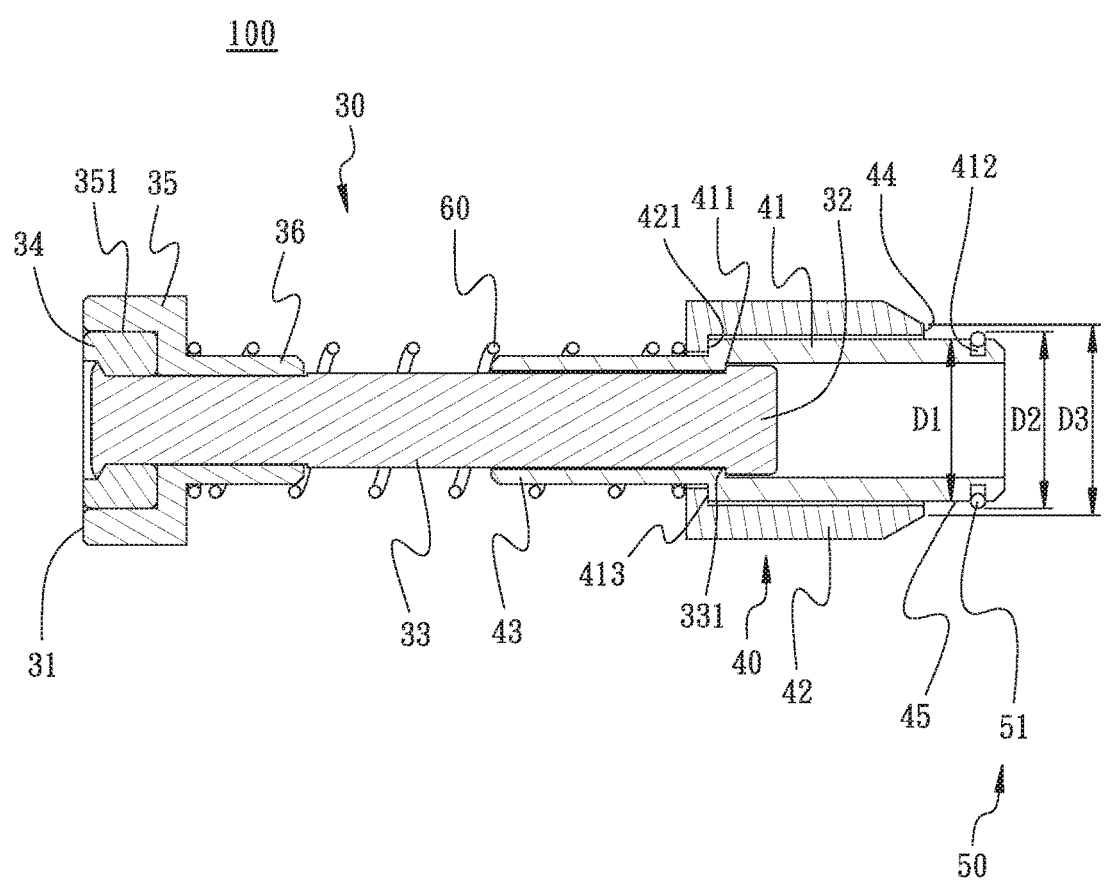
FIG. 5 is a sectional view of the quick detachable and adjustable magnetic seat for sleeve in accordance with an embodiment of the present invention.

Referring to FIG. 5 and FIG. 7, when the resilient quick detach device 50 of the adjustable magnetic seat 100 approaches the protrusion ring 201 of the sleeve 200, the user is able to impose a force to place the resilient quick detach device 50 at an elastic deformation position, so as to cause the C-clamp 51 to radially contract, thus varying the size of the second outer diameter D2 to be at least equal to the size of the first outer diameter D1 of the second axle member 41. With such process, the resilient quick detach device 50 on the detachable positioning device 40 is elastically deformed to pass the protrusion ring 201.

Referring to FIG. 5 and FIG. 8, when the resilient quick detach device 50 of the adjustable magnetic seat 100 passes the protrusion ring 201 of the sleeve 200 and enters a rectangular bore 203, the resilient quick detach device 50 is restored to the normal position, wherein the second outer diameter D2 of the C-clamp 51 is larger than the first outer diameter D1 of the second axle member 41, whereby the received section 45 is received by the protrusion ring 201. Also, the sliding seat 42 is pushed by the spring 60 and resists against one side of the protrusion ring 201, while the other side of the protrusion ring 201 is engaged and fixed by the resilient engage member of the resilient quick detach device 50, whereby the adjustable magnetic seat 100 is efficiently installed in the sleeve 200. Further, the user is allowed to manually assembly the adjustable magnetic seat 100 and the sleeve 200 without additional tools. Also, the adjustable magnetic seat 100 is applicable to various types of sleeves 200 with different thicknesses of the protrusion ring 201, facilitating a wide-ranged exploitation. In contrast, when the adjustable magnetic seat 100 is to be removed from the sleeve 200, the user needs only operates in a reverse order by referring to FIG. 7 to FIG. 6. By axially pushing the adjustable magnetic seat 100 along the sleeve 200 through the rectangular bore 203, the user imposes a force to cause the deformation of the resilient quick detach device 50, such that the resilient quick detach device 50 radially contracts to pass the protrusion ring 201 of the sleeve 200. Therefore, the adjustable magnetic seat 100 is efficiently detached from the sleeve 200.

Figure 9:
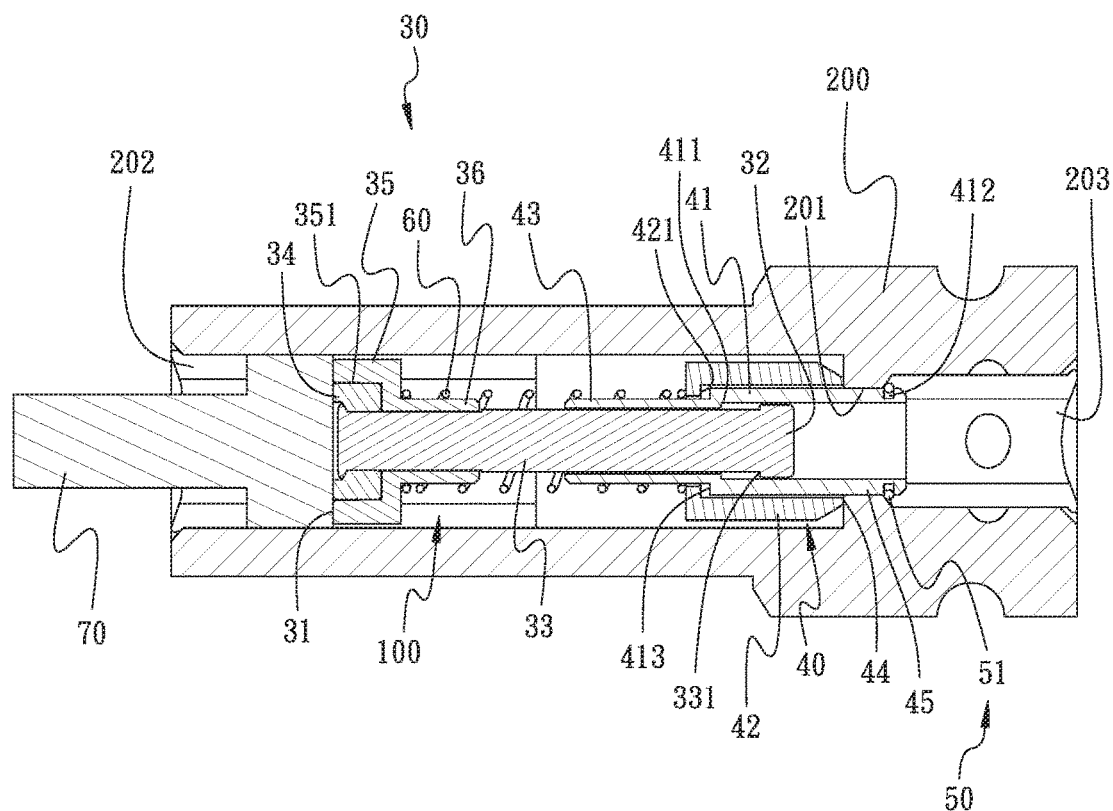
FIG. 9 is a schematic view illustrating the operating status of the quick detachable and adjustable magnetic seat for sleeve.

Referring to FIG. 9, an operating member 70 is directly combined in the hexagonal bore 202 of the sleeve 200, while the rectangular bore 203 of the sleeve 200 is connected by a power tool for driving the operating member 70. When the operating member 70 is combined in the hexagonal bore 202 of the sleeve 200, the operating member 70 is able to be attracted by the magnet 34, so as to be pushed and driven by use of the sleeve 200. During operation, the operating member 70 attached to the sleeve 200 is prevented from detachment, and the bear seat 35 of the magnetic device 30 moves toward the protrusion ring 201 of the sleeve 200. When the operation is finished, the operating member 70 is restored to a non-operating position by the spring 60 and capable of being detached from the sleeve 200.

With such configuration, the adjustable magnetic seat 100 is allowed to be efficiently installed in the removed from the sleeve 200. When the sleeve 200 is damaged or broken, the user is able to detach the adjustable magnetic seat 100 from the sleeve 200 and apply the detached adjustable magnetic seat 100 onto a new sleeve 200, thus preventing the adjustable magnetic seat 100 from being discarded together with the damaged sleeve 200, thereby avoiding unnecessary waste of resource and lowering the cost needed for purchasing a new replacement.

Figure 10:
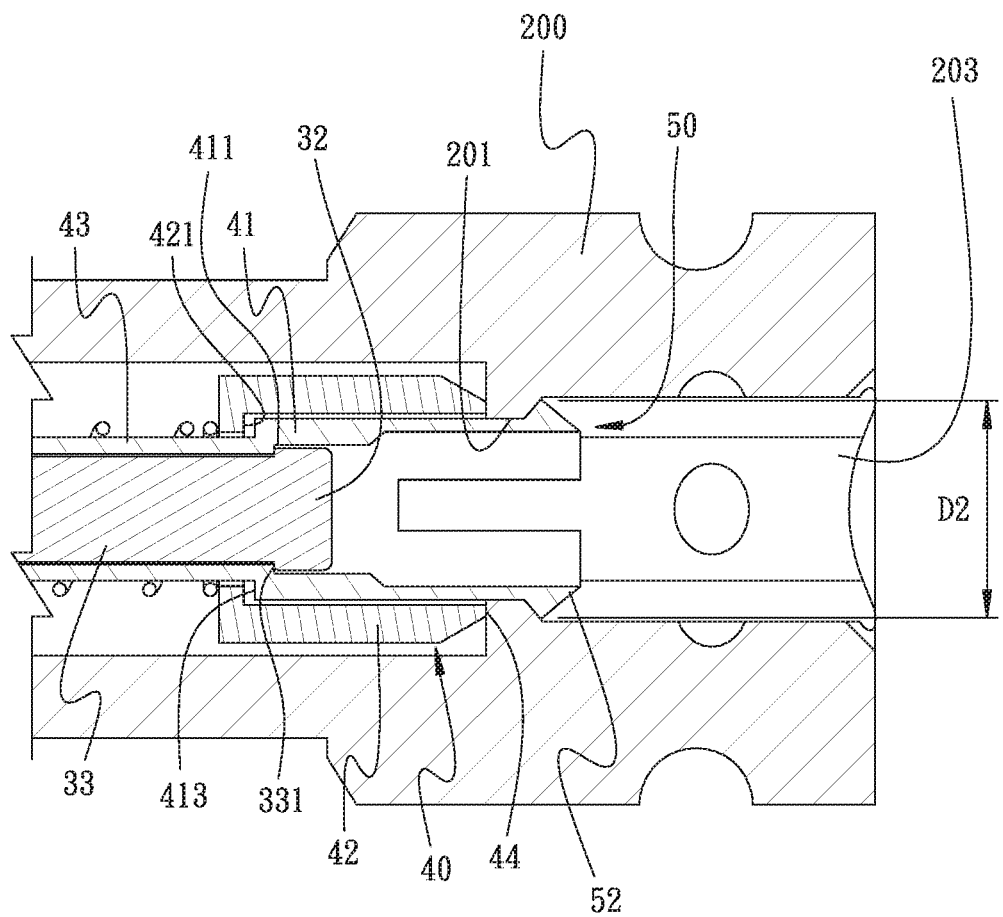
FIG. 10 is a sectional view of the quick detachable and adjustable magnetic seat for sleeve in accordance with a second embodiment of the present invention, with the resilient quick detach device being a hook portion.

Referring to FIG. 10, a second embodiment of the present invention is illustrated. The resilient engage member of the resilient quick detach device 50 is integrally formed in a hook portion 52 which is disposed on one end of the detachable positioning device 40 away from the connecting end 43. The hook portion 52 defines the second outer diameter D2, wherein the two distal ends of the second outer diameter D2 are located at the outer periphery of the hook portion 52. Through the elastic deformation of the hook portion 52 and through the installation process from FIG. 6 to FIG. 8, the adjustable magnetic seat 100 is efficiently installed in or removed from the sleeve 200.

Figure 11:
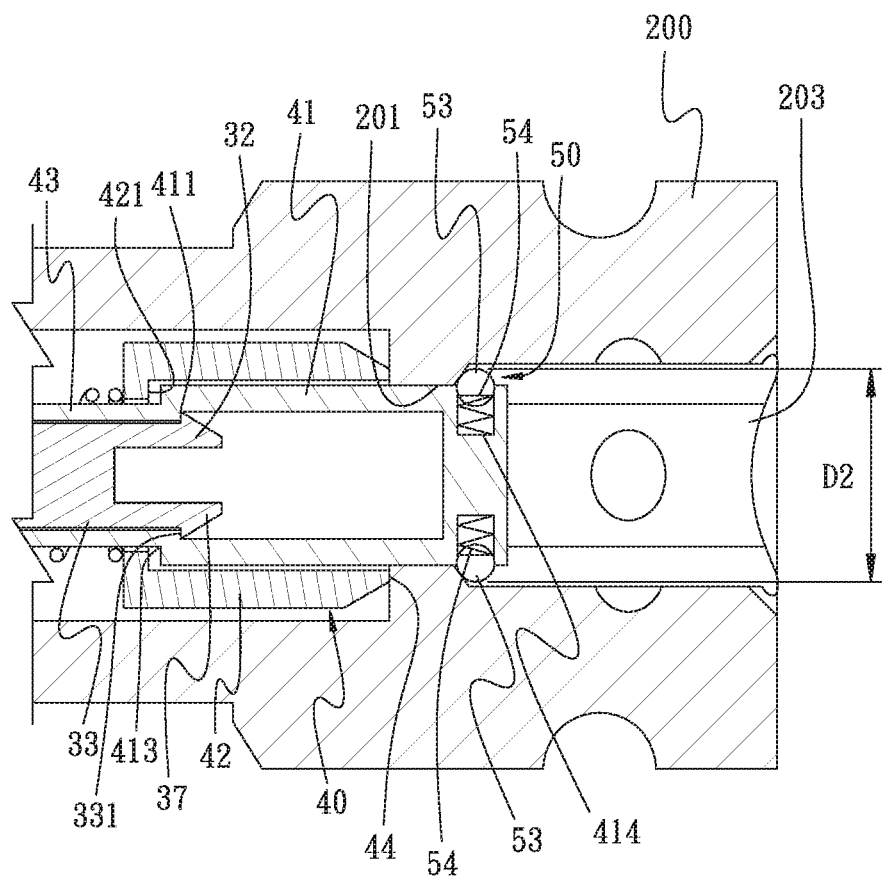
FIG. 11 is a sectional view of the quick detachable and adjustable magnetic seat for sleeve in accordance with a third embodiment of the present invention, with the resilient quick detach device being a ball member and a spring.

Referring to FIG. 11, a third embodiment of the present invention is illustrated. The resilient engage member of the resilient quick detach device 50 includes a ball member 53 and a resilient member 54. In the embodiment, two ball members 53 and two resilient members 54 are provided and transversely disposed on two lateral sides on one end of the detachable positioning device 40 away from the connecting end 43. In other words, each resilient member 54 and the corresponding ball member 53 are orderly embedded in a radial groove 414 formed on one lateral side of the second axle member 41. Further, in this embodiment, the two distal ends of the second outer diameter D2 are located on the outer periphery of the two ball members 53. Also, the second end 32 of the first axle member 33 of the magnetic device 30 refers to a resilient tenon member 37, such that the first axle member 33 is allowed to pass through the connecting end 43 of the second axle member 41, and subsequently positioned due to the limitation function imposed by the second limit portion 411 of the second axle member 41. Therefore, the first axle member 33 and the second axle member 41 are easily installed and removed. With such configuration, with the pushing force imposed upon the ball members 53 for compressing the resilient members 54, the adjustable magnetic seat 100 is efficiently installed in or removed from the sleeve 200.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A quick detachable and adjustable magnetic seat for a sleeve comprises:
   a magnetic device including:
      a first end;
      a second end; and
      a first axle member;
   wherein the first end is magnetic and disposed on one end of the first axle member, the second end is disposed on another end of the first axle member; and
   a detachable positioning device including:
      a second axle member;
      a sliding seat;
      a connecting end attaching to one end of the second axle member; and
      a resilient quick detach device, disposed on another end of the second axle member away from the connecting end;
      wherein the sliding seat is slidably disposed on an outer periphery of the second axle member, the second axle member is slidably disposed on the second end, the connecting end is slidably disposed on the first axle member; and
   a spring disposed between the magnetic device and the detachable positioning device and resisting upon the sliding seat, wherein the magnetic device axially slides against the detachable positioning device and moves back to an original position after sliding against the detachable positioning device, and the detachable positioning device is removably disposed in the sleeve.

2. The quick detachable and adjustable magnetic seat of claim 1, wherein when the adjustable magnetic seat is being disposed in the sleeve, the adjustable magnetic seat is axially pushed along the sleeve toward one end of the sleeve, so as to be engaged therein; when the adjustable magnetic seat to be removed from the sleeve, the adjustable magnetic seat is axially pushed toward the other end of the sleeve, so as to be efficiently removed from the sleeve.

3. The quick detachable and adjustable magnetic seat of claim 2, wherein the resilient quick detach device is a resilient engage member, the detachable positioning device has a first outer diameter, the resilient engage member has a second outer diameter which is larger than the first outer diameter, such that the resilient engage member is engaged with an inner side of the sleeve, and the resilient engage member is optionally situated at an elastic deformation position, such that the detachable positioning device freely passes through the sleeve.

4. The quick detachable and adjustable magnetic seat of claim 3, wherein the magnetic device is provided with a support portion facing the connecting end; when the support portion contacts the connecting end, the spring is prevented from being completely compressed.

5. The quick detachable and adjustable magnetic seat of claim 4, wherein the magnetic device includes a magnet disposed on one end of the first axle member and provides a magnetism; the connecting end of the detachable positioning device is slidably disposed on another end of the first axle member, the first axle member is provided with a first limit portion, and the second axle member is provided with a second limit portion, and when the spring moves the magnetic device back to the original position, the first limit portion and the second limit portion prevent the spring from detaching the magnetic device from the detachable positioning device.

6. The quick detachable and adjustable magnetic seat of claim 5, wherein the detachable positioning device further includes a resisting side facing the resilient quick detach device, and the resisting side defines a third outer diameter which is larger than the first outer diameter, such that a received section is formed between the resilient quick detach device and the resisting side, and the received section is received by a protrusion ring formed on an inner side of the sleeve.

7. The quick detachable and adjustable magnetic seat of claim 6, wherein the resisting side is positioned on one end of the sliding seat away from the spring.

8. The quick detachable and adjustable magnetic seat of claim 7, wherein an outer wall of the second axle member is further provided with a third limit portion, and an inner side of the sliding seat is provided with a fourth limit portion, such that the third limit portion and the fourth limit portion conduct a blocking function and prevent the sliding seat from detaching from the second axle member toward the resilient quick detach device.

9. The quick detachable and adjustable magnetic seat of claim 7, wherein the magnetic device further includes a bear seat containing the magnet, and the bear seat and the magnet are disposed on the first axle member, the spring is disposed between the bear seat and the detachable positioning device, and the support portion is formed on the bear seat and faces the connecting end.

10. The quick detachable and adjustable magnetic seat of claim 3, wherein the resilient engage member is a C-clamp disposed on the detachable positioning device, a cross-section of the C-clamp is formed in a circular shape, the second outer diameter is defined by crossing two distal ends that are located at an outer edge of the C-clamp, and the first outer diameter is defined at a portion of the detachable positioning device adjacent to the resilient engage member.

11. The quick detachable and adjustable magnetic seat of claim 3, wherein the resilient engage member is a hook portion integrally formed on the detachable positioning device; the second outer diameter is defined as a length of a diameter with two distal ends thereof located at an outer periphery of the hook portion, and the first outer diameter is defined as a length of a diameter of a portion of the second axle member of the detachable positioning device adjacent to the resilient engage member.

12. The quick detachable and adjustable magnetic seat of claim 3, wherein the resilient engage member includes a ball member and a resilient member, the ball member and the resilient member embedded in the detachable positioning device; the second outer diameter is defined as a length of a diameter with a distal end thereof located at an outer periphery of the ball member, and the first outer diameter is defined as a length of a diameter of a portion of the second axle member of the detachable positioning device adjacent to the resilient engage member.

* * * * *